United States Patent
Hsu et al.

(10) Patent No.: US 7,356,431 B2
(45) Date of Patent: Apr. 8, 2008

(54) METHOD FOR TESTING AN INPUT/OUTPUT FUNCTIONAL BOARD

(75) Inventors: Wen-Chih Hsu, Guangdong (CN); Wei Shao, Guangdong (CN); Shao-Rong Lin, Guangdong (CN); Gao-Hui Dai, Guangdong (CN)

(73) Assignees: Hong Fu Jin Precision Industry (Shen Zhen) Co., Ltd., Bao'an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/309,460

(22) Filed: Aug. 10, 2006

(65) Prior Publication Data

US 2007/0143058 A1    Jun. 21, 2007

(30) Foreign Application Priority Data

Nov. 26, 2005   (CN) .................... 2005 1 0101809

(51) Int. Cl.
*G06F 17/00* (2006.01)

(52) U.S. Cl. .................... 702/117; 702/58; 702/59; 702/120; 702/183; 714/25

(58) Field of Classification Search ................ 702/117, 702/120, 58, 59, 108, 118, 124, 125, 132, 702/136, 185, 189; 714/25, 732; 326/30, 326/31
See application file for complete search history.

(56) References Cited

U.S. PATENT DOCUMENTS

| 5,878,276 A | * | 3/1999 | Aebli et al. ................... 710/19 |
| 6,807,504 B2 | * | 10/2004 | Chen et al. .................. 702/118 |
| 2002/0070741 A1 | | 6/2002 | Siew et al. |
| 2005/0182612 A1 | * | 8/2005 | Anderson et al. ............. 703/18 |

* cited by examiner

*Primary Examiner*—Hal Wachsman
*Assistant Examiner*—Phuong Huynh
(74) *Attorney, Agent, or Firm*—Winston Hsu

(57) ABSTRACT

A computer-based method for testing an input/output functional board is provided. The method includes the steps of: obtaining control information of the computer; testing devices coupled with the input/output functional board by using the control information; and determining whether the devices work normally according to test results. A related system is also disclosed.

12 Claims, 4 Drawing Sheets

METHOD FOR TESTING AN INPUT/OUTPUT FUNCTIONAL BOARD

FIELD OF THE INVENTION

The present invention relates to systems and methods for testing printed circuit boards (PCBs), and more particularly to a system and method for testing an input/output functional board.

DESCRIPTION OF RELATED ART

An input/output functional board installed in a server is a printed circuit board, and provides ports for the server, such as, universal serial bus (USB) port, compact disc read-only memory (CDROM) port, floppy disk drive (FDD) port etc. The input/output functional board may also provide prompt messages, such as, system errors, ultra-temperature alarms etc.

Before being leaving a production factory, the input/output functional board should pass a series of tests to make sure that the input/output functional board works normally. Conventional methods or solutions for testing the input/output functional boards are installing the input/output functional board on the server, so as to detect whether functions of the input/output functional board are normal. Although such a method or solution can test whether the input/output functional board works normally, working efficiency is very low, and when a plurality of input/output functional boards need to be tested, the server is very easy to be damaged, and testing costs virtually be increased.

What is needed, therefore, is a system and method for testing an input/output functional board that utilize control information provided by a computer to test the functions of the input/output functional board.

SUMMARY OF THE INVENTION

A system for testing an input/output functional board in accordance with a preferred embodiment is provided. The system includes a computer, a test fixture and the input/output functional board that is to be tested. The computer connects the input/output functional board through the test fixture. A test unit in the computer includes: an obtaining module for obtaining control information of the computer; a testing module for testing devices coupled with the input/output functional board by using the control information; and a judging module for determining whether the devices tested work normally according test results.

Another preferred embodiment provides a computer-based method for testing an input/output functional board. The method includes the steps of: obtaining control information of the computer; testing devices coupled with the input/output functional board by using the control information; and determining whether the devices tested work normally according to test results.

Other advantages and novel features of the present invention will be drawn from the following detailed description of a preferred embodiment and preferred method with the attached drawings.

DETAILED DESCRIPTION OF THE INVENTION

In order to describe the preferred embodiments conveniently, the following technical terms are defined: GPIO: general purpose input/output; I2C Bus: inter-integrated circuit bus; SM Bus: system management bus; SFC: shop floor control; USB: universal serial bus; LED: light-emitting diode; PCB: printed circuit board; LAN: local area network; CDROM: compact disc read-only memory; FDD: floppy disk drive.

Figure 1:
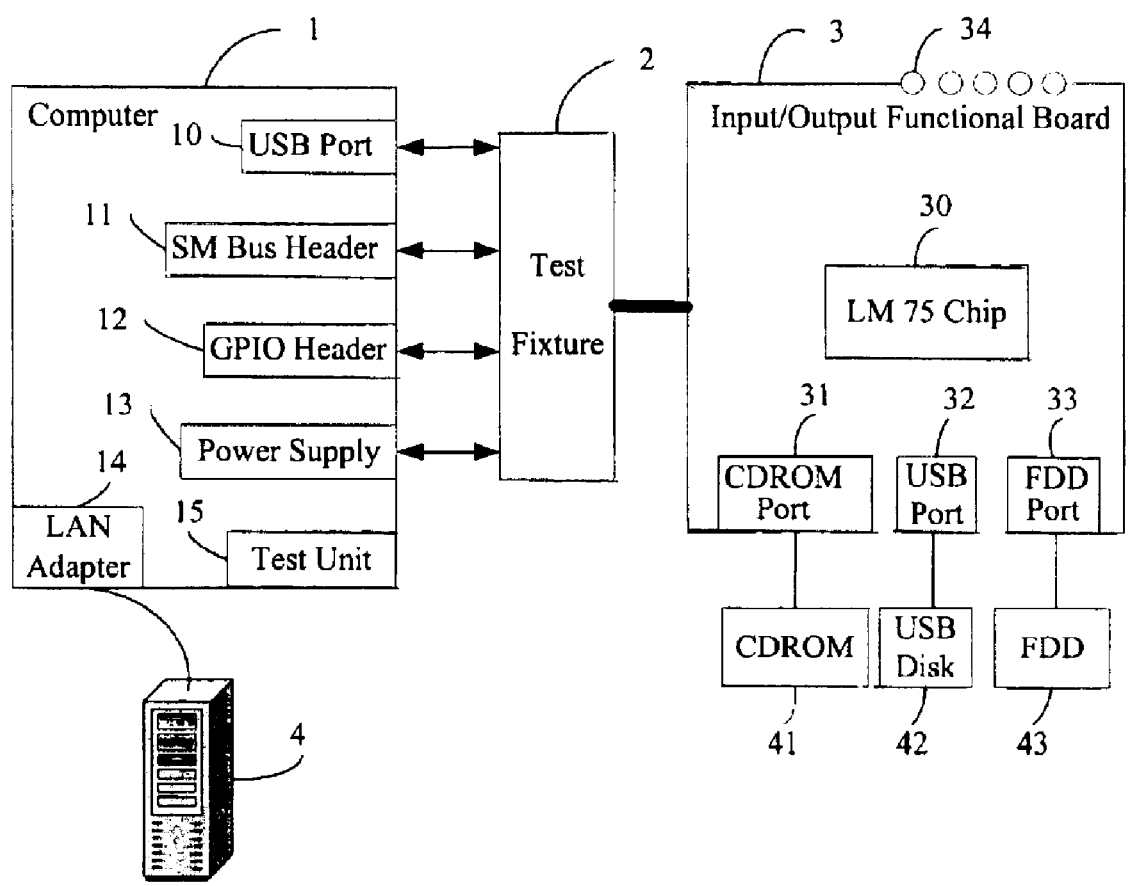
FIG. 1 is a schematic diagram of hardware infrastructure of a system for testing an input/output functional board in accordance with a preferred embodiment.

FIG. 1 is a schematic diagram of hardware infrastructure of a system for testing an input/output functional board (hereinafter "the system"), in accordance with a preferred embodiment. The system typically includes a computer 1, a test fixture 2, an input/output functional board 3 that is to be tested (hereinafter "the board 3"), and an SFC server 4.

The computer 1 is used for providing control information for the board 3 and displaying test results through a monitor connected thereto (not shown). Typically, the computer 1 may include a USB port 10, an SM bus header 11, a GPIO header 12, a power supply 13, a LAN adapter 14, and a test unit 15. For basic operations, the computer 1 may also include a central processing unit (CPU), a memory, and other units or hardware, such as an audio card, a graphic accelerating card, a keyboard, a mouse, and so on. However, in order to describe the preferred embodiment concisely, these units are not shown in the drawings.

The USB port 10 is used for providing USB signals to test memory storages connected to the board 3. The memory storages may be, such as, a CDROM 41, a USB disk 42, and a FDD 43 etc. The SM Bus header 11 is used for providing I2C Bus signals for the board 3 in order to test I2C devices on the board 3 such as chips and indicator lights etc. In the preferred embodiment, the chip is an LM 75 chip 30, and the indicator lights are LED indicator lights 34. The GPIO header 12 is used for providing control information to control the board 3, such as detecting the existence of the board 3, turning on the power of the I2C devices on the board 3, and detecting the interrupt pin status of the LM 75 chip 30 etc. The power supply 13 is used for providing an electrical power for the board 3; the electrical power voltage may be 12V. The LAN adapter 14 is used for connecting the SFC server 4 to the computer 1. The SFC server 4 is used for testing whether the board 3 has been tested, and saving the test results of the tested board 3.

The test fixture 2 is used for connecting the board 3 to the computer 1. The test fixture 2 is made up of 4 layers of PCBs, and includes a USB port, an SM Bus port, a GPIO port, a power port and an input/output functional board connector respectively connected to the USB port 10, the SM Bus header 11, the GPIO header 12 and the power supply 13 of the computer 1. The test fixture 2 is linked to the board 3 through the input/output functional board connector via a cable, in order to transform the control information of the computer 1 into signals corresponding to the board 3.

The devices coupled with the board 3 include: the LM 75 chip 30 for testing an environmental temperature; a CDROM port 31 for connecting the CDROM 41; a USB port 32 for connecting the USB disk 42; an FDD port 33 for connecting the FDD 43; and 5 LED indicator lights 34 including a power indicator light and a temperature indicator light for prompting power states, temperature conditions, and system errors etc.

Figure 2:
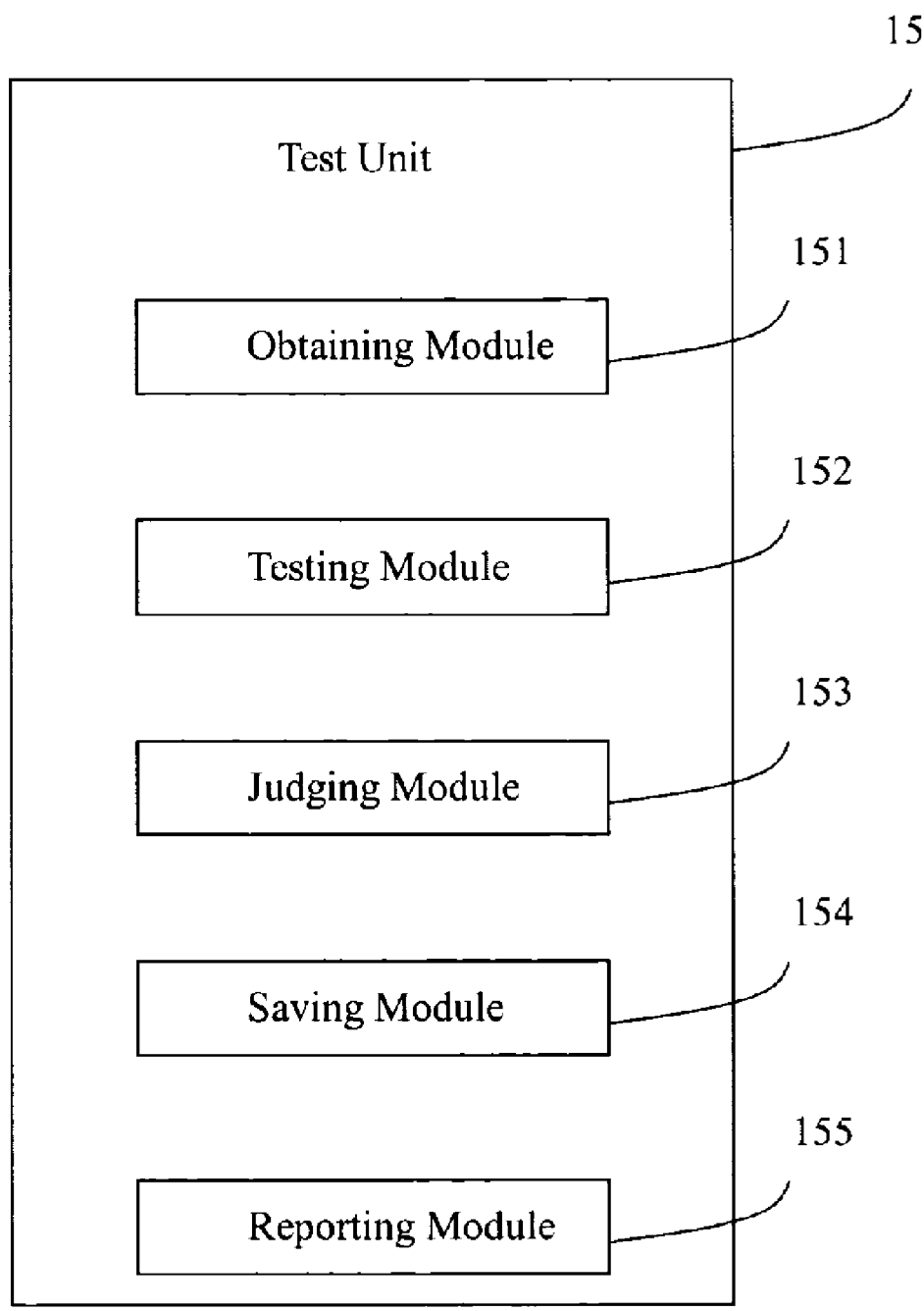
FIG. 2 is a schematic diagram of function modules of a test unit in FIG. 1.

FIG. 2 is a schematic diagram of function modules of the test unit 15 of FIG. 1. The test unit 15 mainly includes an obtaining module 151, a testing module 152, a judging module 153, a saving module 154, and a reporting module 155.

The obtaining module 151 is used for obtaining control information of the computer 1. The control information may include, for example, USB signals, I2C Bus signals, and GPIO signals. The control information may control the devices coupled with the board 3 through the test fixture 2. For example, the USB signals may be used to test the CDROM 41, the USB disk 42, and the FDD 43 connected with the board 3; the I2C Bus signals may be used to test the LM 75 chip 30 and LED indicator lights 34 on the board 3; and the GPIO signals may be used to detect the existence of the board 3, turn on the power of the I2C devices on the board 3, and detect the interrupt pin status of the LM 75 chip 30 etc.

The testing module 152 is used for testing the devices coupled with the board 3 through the control information obtained by the obtaining module 151. The judging module 153 is used for determining whether the functions of the board 3 are normal according to the test results; determining whether all channels have been tested; and determining if a confirmation message from the SFC server 4 is received. When the LM 75 chip 30 is being tested, the judging module 153 determines whether a difference of environmental temperature between the computer 1 and the LM 75 chip 30 is less than a predetermined value; and determines whether the interrupt pin status of the LM 75 chip 30 varies if a limited temperature of the LM 75 chip 30 changes.

The channels are circuits used for transmitting data between various kinds of devices, the channels can be divided into channel A and channel B. The channel A and the channel B have identical functions and work independently. The channels are configured to have only one channel at work, and the other channel at ready-for-use. When any channel breaks down, the other channel will be used.

The saving module 154 is mainly used for saving the test results into the SFC server 4. The reporting module 155 is mainly used for reporting the test results. The test results may be shown on a monitor or printed by a printer, or in other suitable manners.

Figure 3:
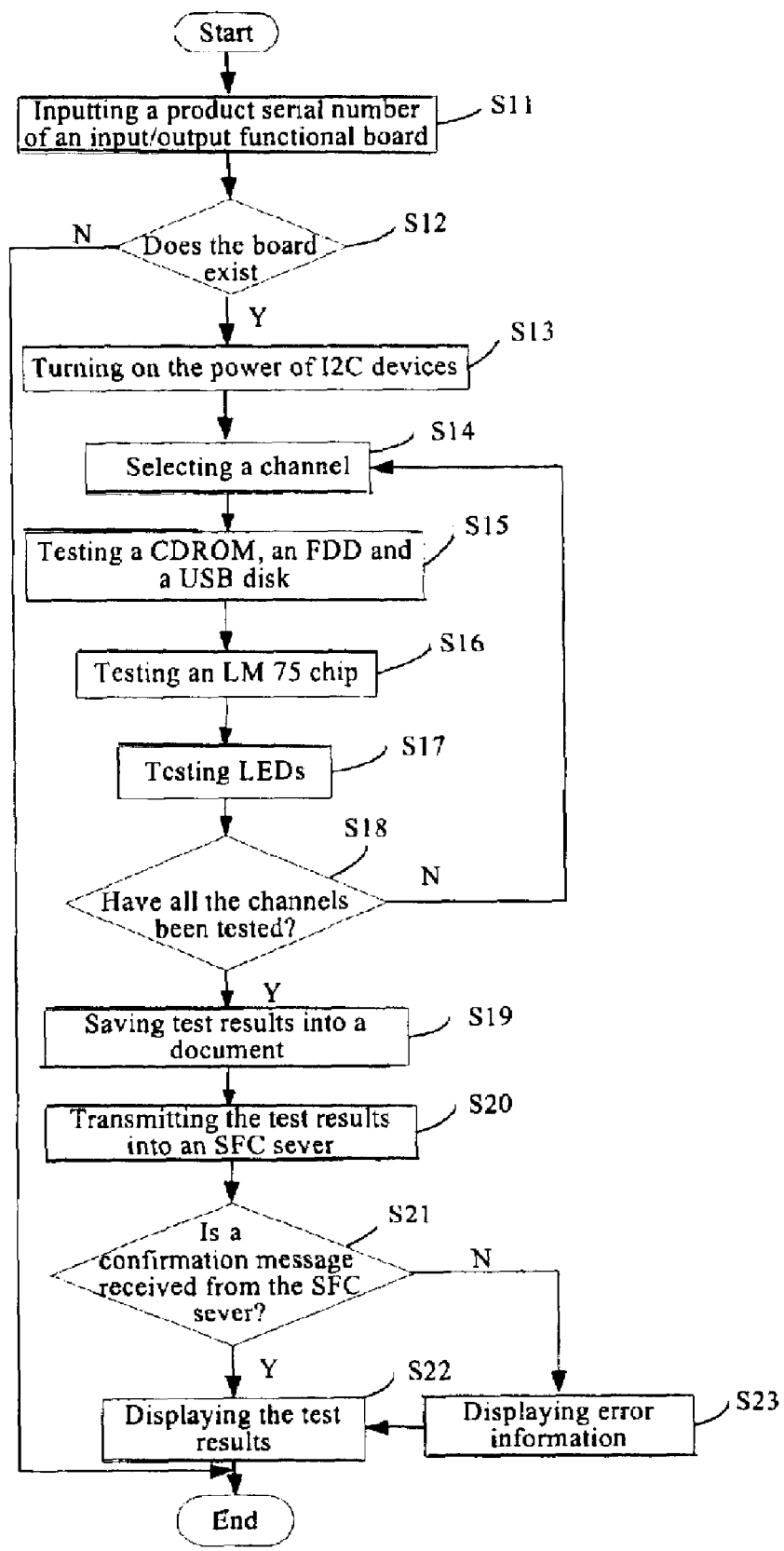
FIG. 3 is a flowchart of a preferred method for testing an input/output functional board in accordance with a preferred embodiment.

FIG. 3 is a flowchart of a preferred method for testing an input/output functional board in accordance with a preferred embodiment. Test preparations may include: setting the operating system (OS) of the computer 1, for example, with Win2000, or Win Xp; setting the motherboard of the computer 1, for example, as BarntGreen or Kapok; forbidding installing memory storage devices in the computer 1 to avoid test results of the memory storages on the board 3 being affected; connecting the computer 1 with the test fixture 2 and connecting the test fixture 2 with the board 3; and connecting all the devices to be tested to corresponding ports on the board 3.

In step S11, the computer 1 communicates with the SFC server 4 via a network. The network may be a LAN or the Internet. A user inputs a product serial number of the board 3. The product serial number is then transmitted to the SFC server 4 to make sure the board 3 has not been tested before. If the board 3 has been tested, another board 3 will be tested.

In step S12, the obtaining module 151 obtains GPIO signals of the computer 1 to detect if the board 3 exists. If the board 3 does not exist, the procedure ends. If the board 3 exists, in step S13, the test unit 15 turns on the power of the I2C devices on the board 3 by using the GPIO signals in order to enable I2C Bus to work. The I2C devices include the LM 75 chip 30, the LED indicator lights 34, and so on.

In step S14, the test unit 15 selects a channel (channel A or channel B) to be tested. In step S15, the obtaining module 151 obtains USB signals of the computer 1, and the testing module 152 tests the CDROM 41, the USB disk 42, and the FDD 43 connected with the board 3 by using the USB signals. During testing, the testing module 152 firstly detects whether the CDROM 41, the USB disk 42, and the FDD 43 exist. If they exist, the testing module 152 writes data into the USB disk 42, and the FDD 43, and reads data from the USB disk 42 and the FDD 43. The testing module 152 compares the two data in order to verify whether the read-write functions of the USB disk 42 and the FDD 43 are normal. If the CDROM 41 is read only, the testing module 152 only reads data from the CDROM 41 to verify it.

In step S16, the obtaining module 151 obtains I2 C signals and GPIO signals of the computer 1, and the testing module 152 tests the LM 75 chip 30 by using the I2C signals and the GPIO signals. During testing, the test unit 15 reads an environmental temperature of the LM 75 chip 30 by using the I2C signals, and detects the interrupt pin status of the LM 75 chip 30 by using the GPIO signals. Detailed description of step S16 is provided below in relation to FIG. 4.

In step S17, the testing module 152 tests the LED indicator lights 34. During testing, the testing module 152 firstly tests the indicator light corresponding to power. If the indicator light shines when the power is turned on, the indicator light is normal. Other LED indicator lights are tested similarly.

In step S18, the judging module 153 determines whether all the channels have been tested. If any channel has not been tested, the procedure returns to step S14 described above. Otherwise, if all the channels have been tested, in step S19, the saving module 154 saves the test results into a document of the computer 1. In step S20, the computer 1 transmits the test results into the SFC server 4 via the network.

In step 21, the judging module 153 determines whether a confirmation message is received from the SFC server 4, this is to make sure if the saving module 154 have saved the test results into the SFC server 4. If the confirmation message is received, in step S22, the reporting module 155 displays the test results. Otherwise, if no confirmation message is received, the reporting module 155 displays error information, and the procedure returns to step S22.

Figure 4:
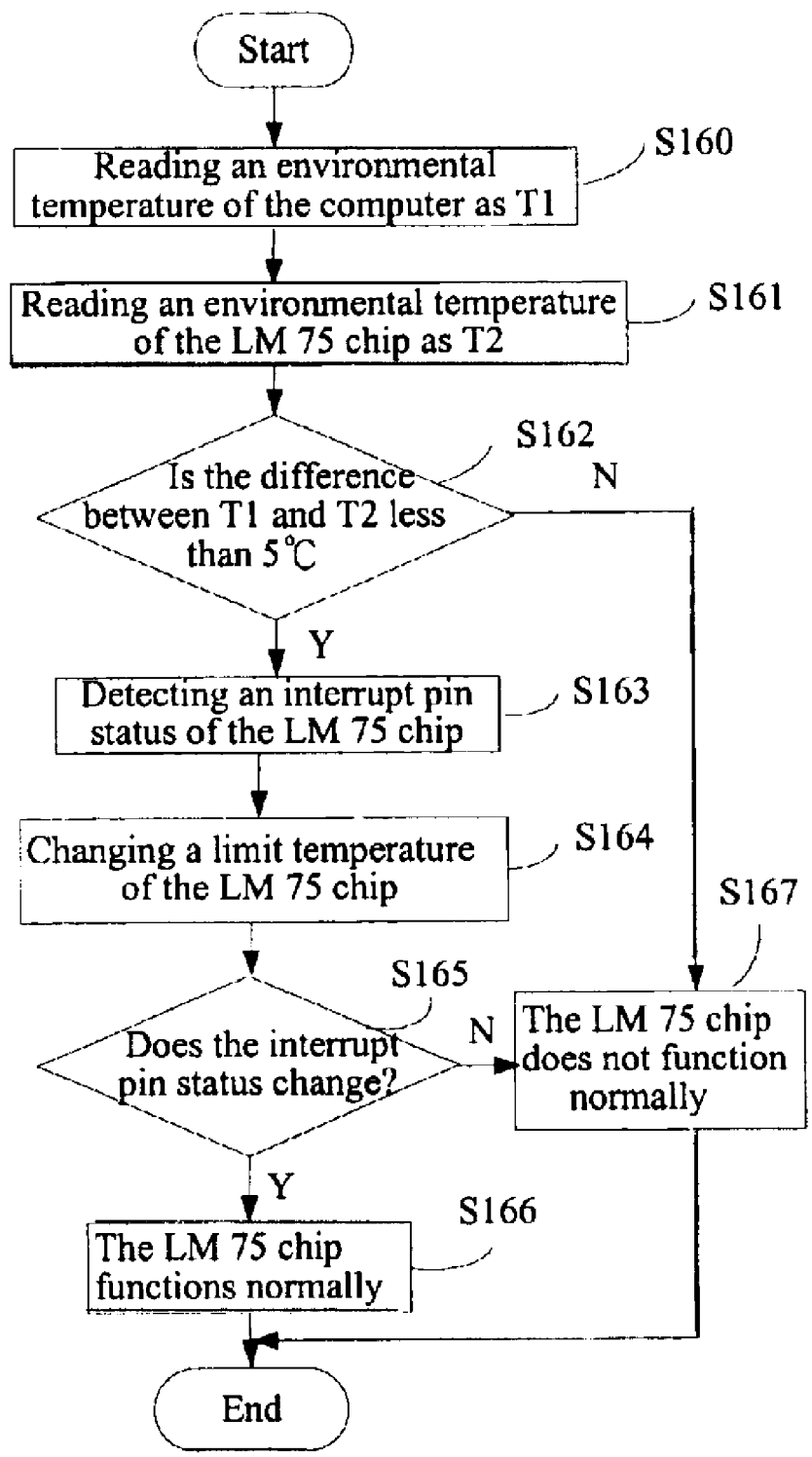
FIG. 4 is a flowchart illustrating one step of FIG. 3 in detail, namely testing an LM 75 chip.

FIG. 4 is a flowchart illustrating step S16 in detail, namely testing the LM 75 chip 30. In step S160, the obtaining module 151 obtains the environmental temperature of the computer 1 as T1. In step S161, the obtaining module 151 obtains the environmental temperature of the LM 75 chip 30 as T2. In step S162, the judging module 153 determines whether the difference between T1 and T2 is less than a predetermined value. In the preferred embodiment, the predetermined value is 5° C.

If the difference is less than 5° C., in step S163, the obtain module 151 obtains GPIO signals, and the testing module 152 detects the interrupt pin status of the LM 75 chip 30 by using the GPIO signals. The interrupt pin status includes a high level status and a low level status. Usually, if the environmental temperature of the LM75 chip 30 is less than a limited temperature of the LM 75 chip 30, the interrupt pin of the LM75 chip 30 outputs the low level status. Otherwise, if the environmental temperature is more than the limited temperature, the interrupt pin of the LM75 chip 30 outputs the high level status. In step S164, the test unit 15 changes the limited temperature. The environmental temperature of the LM75 chip 30 is read only, thus only the limited temperature of the LM75 chip 30 can be changed for testing if the interrupt pin of the LM 75 chip 30 works normally. In step S165, the judging module 153 determines whether the interrupt pin status of the LM 75 chip 30 changes. If the interrupt pin status changes, the judging module determines the LM 75 chip 30 functions normally. Otherwise, if the interrupt pin status does not change, the judging module determines the LM 75 chip 30 does not functions normally.

For example, if the limited temperature is 80° C., and the environmental temperature is 25° C. when the LM 75 chip 30 is powered on, the interrupt pin of the LM 75 chip 30 outputs the low level status. The test unit 15 changes the limited temperature of the LM 75 chip 30 into a value that is lower than 25° C., such as 5° C. If the interrupt pin outputs the high level status, the LM 75 chip 30 works normally. Otherwise, if the interrupt pin still outputs the low level status, the LM 75 chip 30 does not work normally.

In step S162, if judging module 153 determines the difference between T1 and T2 is more than 5° C., the judging module 153 determines that the LM 75 chip 30 does not work normally.

Although the present invention has been specifically described on the basis of a preferred embodiment and preferred method, the invention is not to be construed as being limited thereto. Various changes or modifications may be made to the embodiment and method without departing from the scope and spirit of the invention.

What is claimed is:

1. A computer-based method for testing an input/output functional board, the method comprising the steps of:
    obtaining control information from a computer;
    testing devices coupled with the input/output functional board by using the control information, the testing comprising the steps of:
        turning on power of inter-integrated circuit devices of the input/output functional board;
        selecting a channel of the input/output functional board to be tested;
        testing one or more memory storage devices connected with the input/output functional board;
        testing one or more chips of the input/output functional board; and
        testing one or more indicator lights of the input/output functional board; and
    determining whether the tested devices work normally according to test results.

2. The method according to claim 1, wherein the control information comprises: universal serial bus signals, general purpose input/output signals, and inter-integrated circuit bus signals.

3. The method according to claim 1, wherein the one or more memory storage devices comprise any one or more items selected from any one or more of the following: compact disc read-only memories (CDROMs), floppy disk drives (FDDs), and universal serial bus (USB) disks.

4. The method according to claim 1, wherein the step of testing one or more chips comprises:
    reading an environmental temperature of the computer as T1;
    reading an environmental temperature of each of the one or more chips as T2;
    determining whether a difference between T1 and T2 is less than a predetermined value;
    detecting an interrupt pin status of the chip if the difference is less than the predetermined value;
    changing a limited temperature of the chip; and
    determining the interrupt pin is normal if the interrupt pin status changes; or
    determining the interrupt pin is abnormal if the interrupt pin status does not change.

5. The method according to claim 4, further comprising:
    determining the chip is abnormal if the difference between T1 and T2 is more than the predetermined value.

6. The method according to claim 4, wherein the predetermined value is 5° C.

7. The method according to claim 4, wherein the interrupt pin status is one of: a low level status and a high level status.

8. The method according to claim 7, wherein the step of changing a limited temperature of the chip comprises:
    reducing the limited temperature of the chip to make the limited temperature lower than the environmental temperature of the chip, if the interrupt pin of the chip outputs the low level status; or
    raising the limited temperature of the chip to make the limited temperature higher than the environmental temperature of the chip, if the interrupt pin of the chip outputs the high level status.

9. The method according to claim 6, further comprising:
    saving the test results; and
    reporting the test results.

10. The method according to claim 2, wherein the universal serial bus signals are configured for testing the one or more memory storage devices connected with the input/output functional board.

11. The method according to claim 2, wherein the inter-integrated circuit bus signals are configured for testing the one or more chips and the one or more indicator lights of the input/output functional board.

12. The method according to claim 2, wherein the general purpose input/output signals are configured for detecting the existence of the input/output functional board, turning on the power of the inter-integrated circuit devices, and detecting an interrupt pin status of each of the one or more chips.

* * * * *